United States Patent [19]

Scales

[11] 3,862,606
[45] Jan. 28, 1975

[54] RADIAL TRUCK

[76] Inventor: Brian T. Scales, 305 Sharon Grange Rd., Aliquippa, Pa. 15001

[22] Filed: June 29, 1973

[21] Appl. No.: 375,024

[52] U.S. Cl. ............................ 105/167, 105/224 R
[51] Int. Cl. .............................................. B61d 1/00
[58] Field of Search ........ 105/165, 167, 168, 224 R, 105/224 A, 224.1, 223, 225

[56] References Cited
UNITED STATES PATENTS

| | | | |
|---|---|---|---|
| 727,919 | 6/1903 | Ellery | 105/168 |
| 1,744,986 | 1/1930 | Richards | 105/168 X |
| 2,029,749 | 2/1936 | Webb | 105/223 |
| 2,245,333 | 6/1941 | Frei | 105/168 |
| 2,355,450 | 8/1944 | Leese | 105/224 R |
| 3,638,582 | 2/1972 | Beebe | 105/224.1 |

Primary Examiner—M. Henson Wood, Jr.
Assistant Examiner—John J. Love
Attorney, Agent, or Firm—Frederick J. Olsson

[57] ABSTRACT

A car truck with wheel sets spring mounting the truck frame and arranged to move with respect to the frame so as to automatically go radial on curves but which are restrained so as to maintain wheel position when the brakes are applied.

9 Claims, 11 Drawing Figures

PATENTED JAN 28 1975

RADIAL TRUCK

This invention relates to railway car equipment and in particular relates to an improved truck having wheel sets which will automatically go radial on curves.

The principal objective of the invention is to provide a truck having a frame supported by wheel sets which are moveably mounted on the truck frame in a manner that on curves the reaction forces will move the wheels of each set to radial positions proportional to the curvature and with the arrangement maintaining wheel position when the brakes are applied both in neutral and in radial condition.

The structure connecting the wheels and axles directly into the truck frame is of primary significance and advantage because it makes possible the attainment of a practical, workable radial truck.

With the radial truck of the invention, the lateral and longitudal counterbalancing forces normally present when a conventional truck is negotiating a curve are reduced to minimum and often times completely eliminated. This is highly advantageous from the standpoint of reducing wheel and rail wear. Moreover, the safety factor is greatly improved because of the elimination of those forces which tend to skew the truck and cause the same to jump the tracks.

Various other objectives and advantages will be apparent from the description below taken in conjunction with the following drawings wherein.

Figure 1:
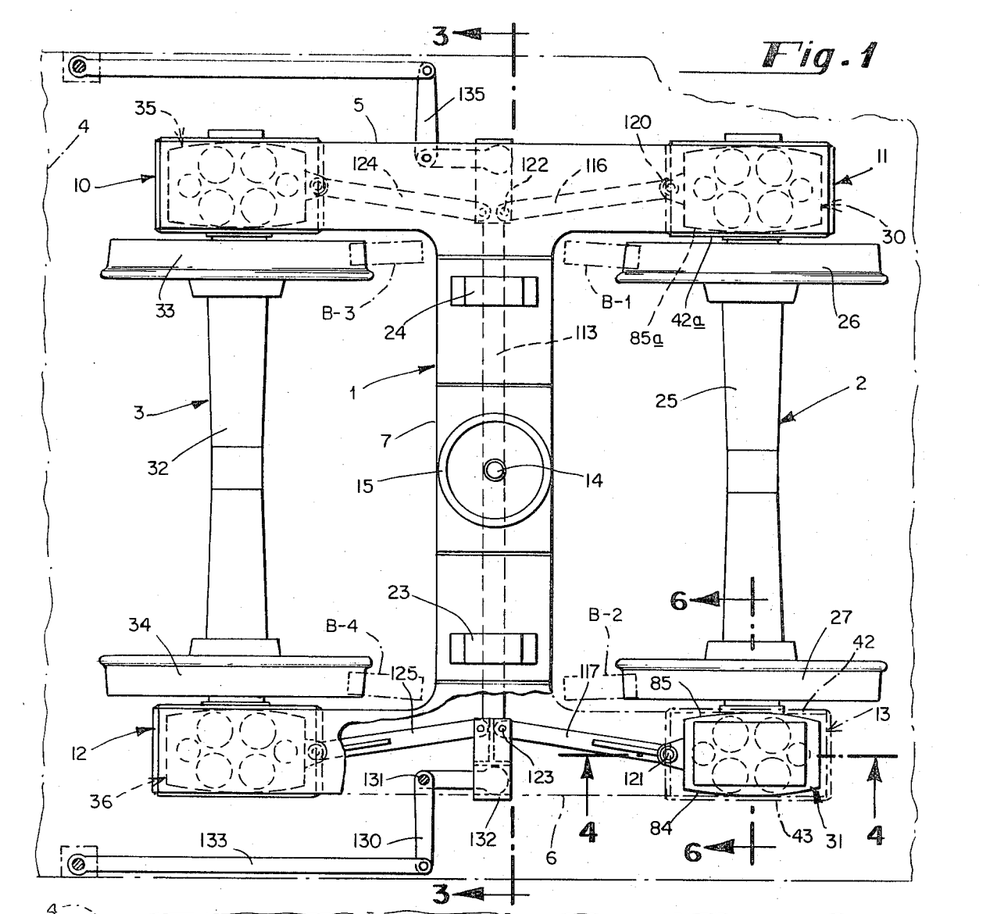
FIG. 1 is a plan view illustrating a truck incorporating the invention.
Figure 2:
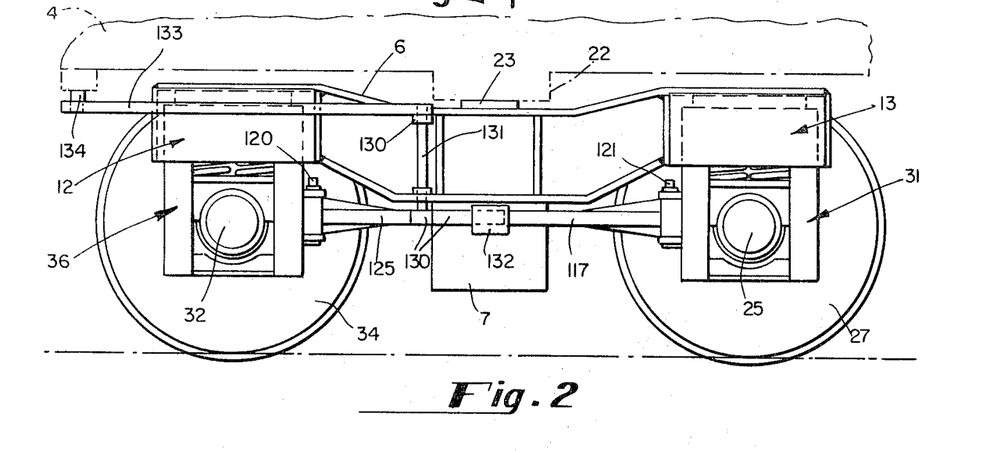
FIG. 2 is a side elevational view of the truck of FIG. 1.

In FIG. 1 the truck includes the frame 1 mounted on the wheel sets 2 and 3. The car frame which is supported by the truck is indicated by the dotted lines 4.

The frame 1 includes the side frames 5 and 6 and center bolster 7. The opposite ends of each side frame is constructed with a hollow pocket. These pockets are indicated at 10, 11, 12 and 13. The truck bolster 7 includes means for rotatably connecting the truck to the car frame 4. This is noted in FIG. 3 wherein the center pin 14 and the bowl receiver 15 are fixed to the bolster 7. These rotatably cooperate with a center bowl 16 mounted on the center plate 20 of the center sill 21 of the car bolster indicated by the dotted line 22. The truck bolster 7 is also provided with side bearings 23 and 24 which engage plates (not shown) on the car bolster 22.

Referring back to FIG. 1, the wheel set 2 includes the axle 25 and the wheels 26, 27 disposed adjacent opposite ends of the axle and the sub-frames 30 and 31 which are respectively disposed in pockets 11 and 13. The sub-frames connect the axle and wheel to the side frames 5 and 6.

The wheel set 2 includes the axle 32, the wheels 33 and 34 and sub-frames 35 and 36 which are respectively disposed in the pockets 10 and 12. The sub-frames 35 and 36 connect the axle and wheels to the side frames 5 and 6.

Thus, in summary, we have a pair of wheel sets 2 and 3 directly supporting a truck frame which in turn supports the railway car.

Figure 6:
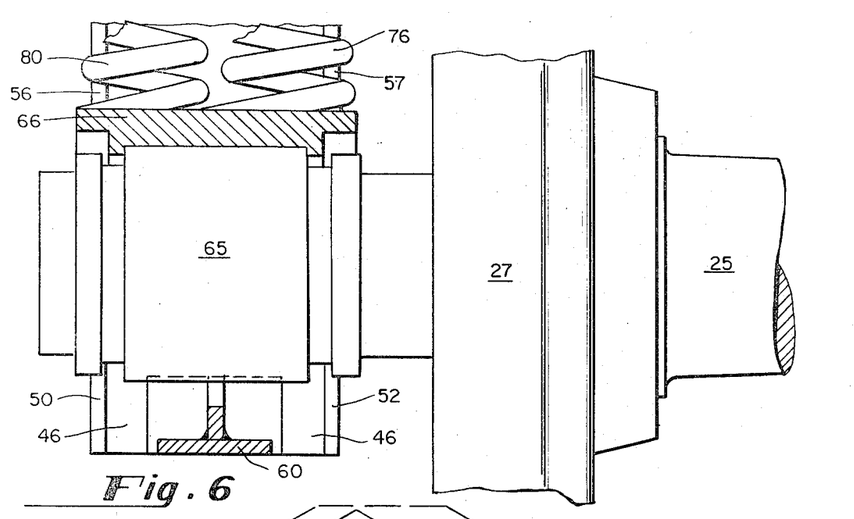
FIG. 6 is an enlarged fragmentary view taken along the lines 6—6 in FIG. 1.
Figure 7:
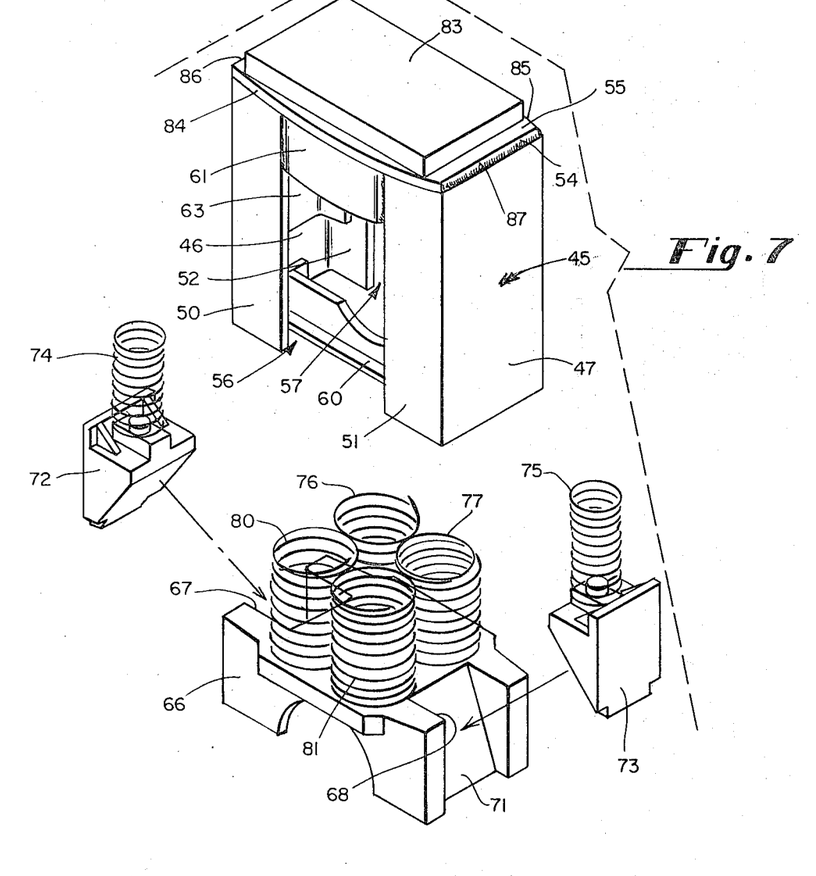
FIG. 7 is an exploded view of certain components of FIG. 4.

The pockets 10, 11, 12 and 13 and the sub-frames 30, 31, 35 and 36 are identical in construction and the description of the same will be in connection with the pocket 13 and sub-frame 31 which is shown in detail in FIGS. 1, 6 and 7.

In FIG. 1 the wheel sets 2 and 3 and the truck frame 1 are shown in the neutral condition, i.e., with the axis of the axles parallel to one another. These components assume the neutral condition when the truck is running on straight parallel tracks.

The pocket 13 (FIG. 5) has end sections 40 and 41 and side sections 42 and 43 and a top section 44 (FIG. 4) all of which are welded together and form part of the side frame 6.

The sub-frame 31 has a housing 45 (FIG. 7) which includes the end walls of 46 and 47 and side walls (FIG. 5) comprising the sections 50/51 and 52/53. Interconnecting the end and side sections is the top 54 (FIGS. 4 and 7) which has a flat surface 55. As best noted in FIG. 7 the housing has aligned openings 56 and 57. At the bottom of the housing there is T-bar 60 which is interconnected to the end walls 46 and 47 and ties the walls together.

Adjacent the top of the housing openings 56 and 57 are the arcuately shaped panels 61 and 62. The panels are welded to the side sections 50/51 and 52/53. As best noted in FIG. 5, the panels are in contact with the side sections 42 and 43 of the pocket 13.

The housing end walls 46 and 47 respectively carry the U-shaped wear plates 63 and 64 which extend around and are connected to the housing side sections 50-53.

With reference to FIG. 6, the axle 25 carries a roller bearing assembly which extends through the openings 56 and 57. Mounted on the bearing assembly 65 is a saddle 66 the opposite ends of which are in contact with the housing wear plates 63 and 64 as is best noted in FIG. 5. The saddle is formed with pockets 67 and 68 (FIG. 7) which respectively have inclined surfaces 70 and 71. The saddle pockets 67 and 68 respectively carry damper shoes 72 and 73 respectively engaging the inclined surfaces on the saddle and the vertical surfaces on the wear plates. A pair of springs 74 and 75 respectively bear between the top of the shoes 72 and 73 and the underside of the housing top 54. The springs keep the shoes in tight engagement with the wear plates and the inclined surfaces.

Between the top of the saddle 66 and the underside of the housing top 54 are compression springs 76, 77, 80 and 81. A wall 82 extends between the panels 61 and 62 operates to separate the springs. If desired, conventional bosses can be provided on the top of the saddle and on the underside of the housing top 54 for the purposes of maintaining spring position.

While I have shown the springs 76, 77, 80 and 81 as being the single coil type, the structure contemplates the use of double coil springs.

Mounted on the flat surface 55 on the housing top 54, is a pad bearing 83 which engages the underside of the pocket top 44. The bearing 83 is made of natural rubber and is adhesively secured to the surface 55 and to the underside of the top 44.

From the above description, it will be apparent that the sub-frames spring support the truck frame 1 directly on the wheels and axles.

Figure 4:
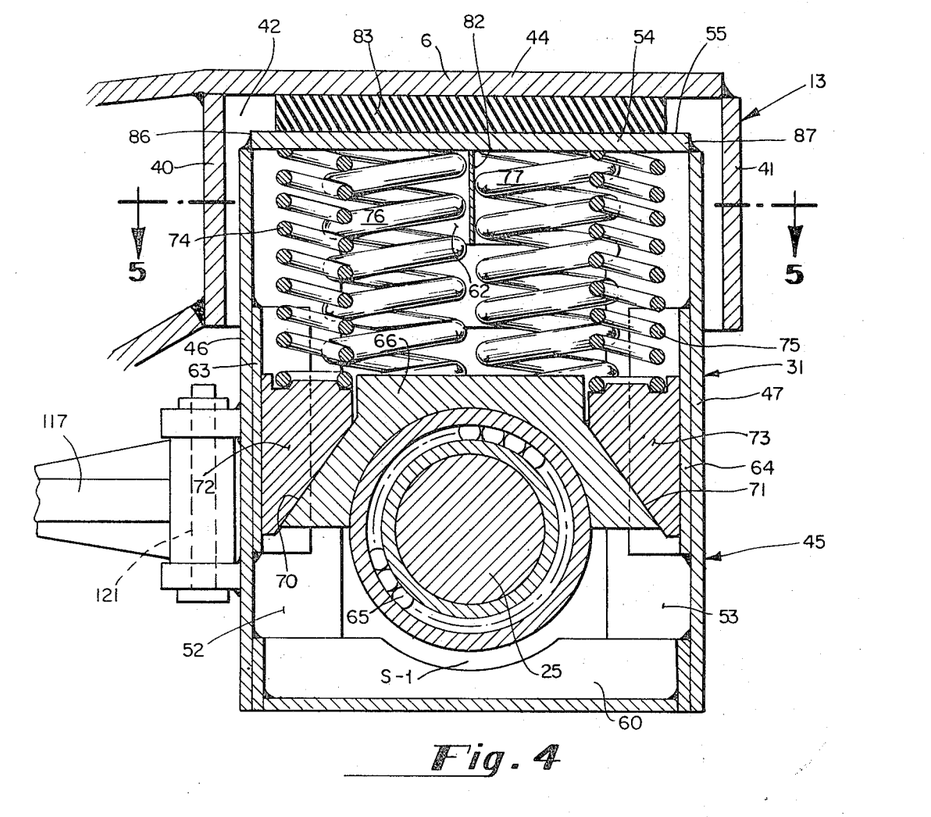
FIG. 4 is an enlarged fragmentary sectional view taken along the lines 4—4 in FIG. 1.
Figure 5:
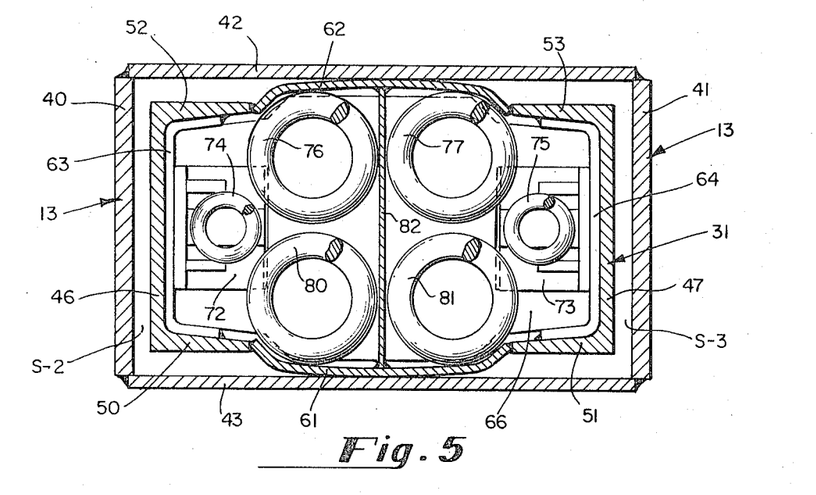
FIG. 5 is a plan view taken along the lines 5—5 in FIG. 4.

The position of the parts as shown on FIG. 4 is for the unloaded condition of the car. The space S-1 between the bearing assembly 65 and the top of the T-bar 60 may in the unloaded condition encompass a range of 1½ inches to 2 inches. However, when the car is fully loaded, the frame and the housing 45 both move down so that the space may be in the order of 3 inches or 4 inches.

The springs 76, 77, 80 and 81 perform the function of isolating the truck from the shock forces on the wheels and axles caused by track imperfections. The imperfections may be a joint in the rail track and the effect of such imperfections is to cause a wheel and axle to move up or down. Where the wheel and axle may bounce due to an imperfection, the shoes 72 and 73 provide a damping action.

The wedging effect created by the inclined surfaces on the saddle shoes magnifies the force of the springs 74 and 75, pushing the shoes against the wear plates.

The bearing pad 83 serves the important functions of supporting the truck on the sub-frame and permitting relative motion between the truck frame and the sub-frame. It is this relative motion which allows the wheels to go radial as will be noted later.

The bearing pad 83 is of high compressive strength and it maintains the spaced relationship between the housing top 54 and the pocket top 44. However, the bearing being yieldable will permit relative motion between the sub-frame and the truck frame. This motion takes place in a horizontal plane or one which is parallel to or contains the axis of the axle 25. The relative motion is restrained so that it can take place in a direction which is transverse the axis of the axle, i.e., as left to right as viewed in FIG. 4 but is restrained in a direction along the axis of the axle.

As with reference to FIGS. 1 and 7, it will be noted that the housing top 54 has contoured side edges 84 and 85 and that these respectively engage the pocket side sections 42 and 43. Similarly the housing panels 61 and 62 engage the pocket side sections 42 and 43. Thus the sub-frame is constrained against direct motion in a direction along the axis of the axle 25.

However, it will be observed that there is considerable space S-2 as between the pocket end section 40 and housing end wall 46. There is a similar space S-3 between the pocket end section 41 and housing end wall 47. These spaces accommodate relative motion between the sub-frame and the pocket in a direction transverse the axle axis. The total motion is limited by the engagement of the end section and end walls; however, the parts are designed so that the amount of relative transverse motion necessary for the smallest radius curve will not usually cause the engagement.

Figure 10:
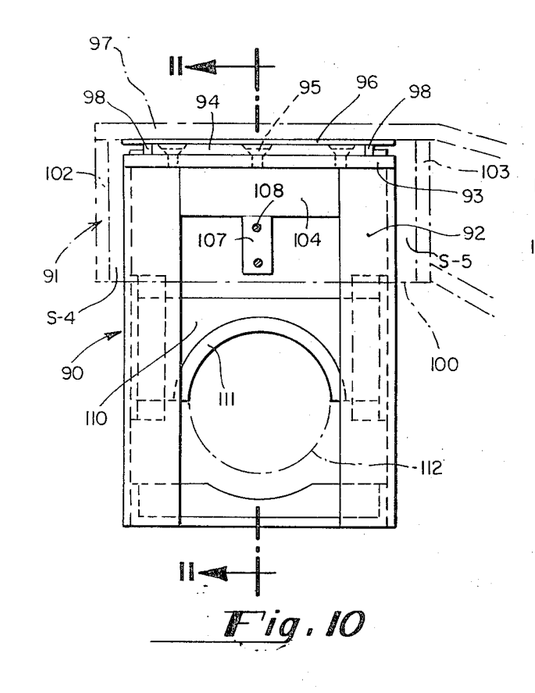
FIG. 10 is an elevational view of a modified sub-frame of the invention.
Figure 11:
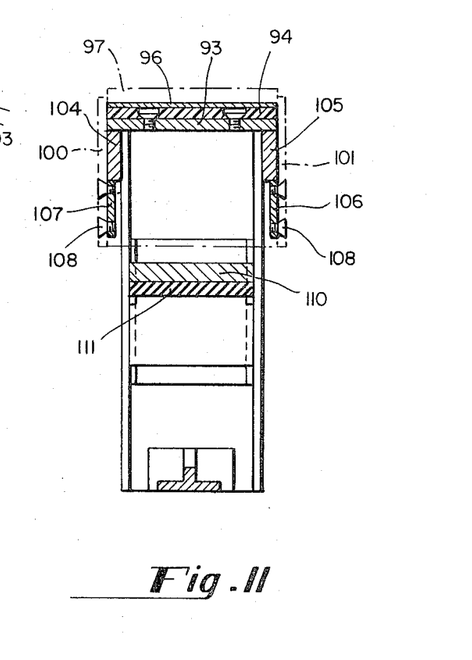
FIG. 11 is a view taken along the lines 11—11 of FIG. 10.

FIGS. 10 and 11 are illustrated as a sub-frame modified to include a slide-type pad bearing, a lateral cushioner for axle shock and a retainer means for the frame and sub-frame. The slide-type bearing will first be described.

In FIG. 10 the sub-frame is indicated at 90 and the pocket of the truck frame indicated at 91. The housing 92 has a top 93. The pad bearing includes the teflon/bronze pad 94 and a stainless steel plate 96 which is welded to the underside of the pocket top 97. The pad and plate are in sliding contact and this contact permits relative motion between the sub-frame and truck frame. The pocket 91 has side sections 100 and 101 (FIG. 11) and end section 102 and 103 (FIG. 10). A pair of felt wipers 98 are mounted on the housing top 93.

In the sub-frame of FIGS. 10 and 11 relative motion between the sub-frame and the pocket (or truck frame) in a direction along the axis of the axle is restrained as similarly described for the sub-frame 31. The pad 94, the top 93 and the panels 104 and 105 (FIG. 11) are contoured so that as to engage the pocket side sections 100 and 101. Motion in a direction transverse the axis of the axle is accommodated by the spaces S-4 and S-5.

In the event of a collision causing a derailment, it is desireable that the truck-frame and the wheel sets do not separate. In order to avoid separation, I have provided a retainer means. Thus on the inside of the pocket side sections 100 and 101, I have provided retainers 106 and 107 which are secured in position by the screws 108. In the position as shown, the retainers engage with the panels 104 and 105. It will be apparent that if the truck frame is lifted vertically the sub-frames will move vertically with it or conversely, the sub-frames cannot be moved down out of the pocket.

To mitigate the effect of lateral track imperfections, I have modified the saddle to include cushioning means. Thus the saddle 110 has a natural rubber pad molded on the underside. The pad fits over and engages the bearing housing 112. The pad functions to prevent transmission of shock or transient motion of the axle due to track imperfections in a lateral direction from getting up into the sub-frame.

Inasmuch as the pad bearings for purposes of going radial, permit the sub-frames and wheels to move in a direction transverse the axis of the axles, it is necessary to provide a means to avoid motion of the sub-frames (with consequent motion of the wheels) at the times the brakes are applied. The brake assemblies B-1 and B-2 (FIGS. 1 and 8) will tend to push the wheels 26 and 27 to the right and the brakes B-3 and B-4 will tend to push the wheels 33 and 34 to the left. If the brakes were applied on a curve, such motion of course would destroy the radial position of the wheels. Thus I have provided a restraining mechanism which will permit the sub-frames and wheels to move in opposite directions as is necessary to attain the radial condition but will prevent the pairs of wheels from moving in the same direction when the brakes are applied.

Figure 3:
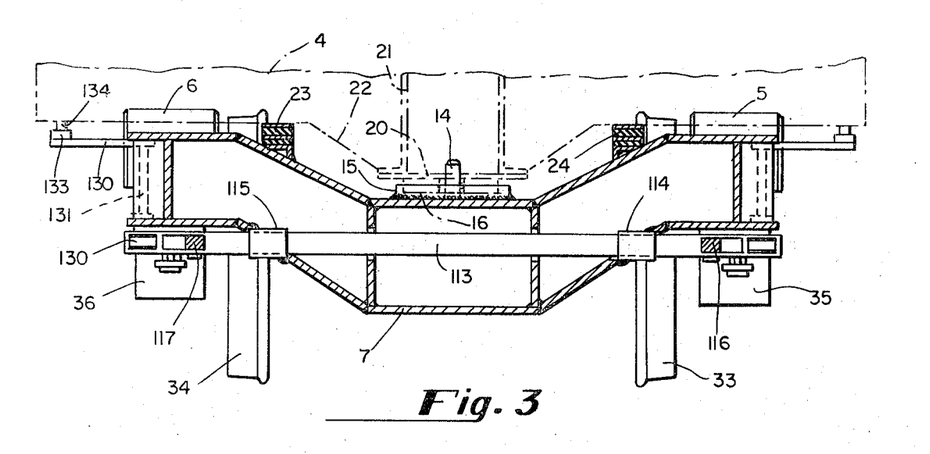
FIG. 3 is an elevational view partially in section taken along the lines 3—3 and FIG. 1.

Thus with reference to FIGS. 1 and 3 a control bar 113 extends through the bolster 7 and is supported for sliding motion in the bolster by the bushings 114 and 115. Tie rods 116 and 117 are connected to the sub-frames 30 and 31 as by the pivots 120 and 121 and connected to the control bar 113 by the pivots 122 and 123. The tie rods 124 and 125 are similarly pivotly connected between the control bar and the sub-frames 35 and 36. As noted in FIG. 1, the tie rods are inclined inwardly in the neutral condition of the truck. The bar and tie rods shift in position for the radial condition as will be noted later.

A bell crank 130 is mounted on a vertical rod 131 supported in the side frame 6. One end of the bell crank extends into the socket 132 on the end of control bar 113 while the other end is connected to a link 133 which in turn is connected to the car frame 4 as by the pin 134. The bell crank 135 is similarly mounted.

The bell cranks being connected back into the car will not restrain the motion necessary to attain the radial condition inasmuch as there is relative rotation as between the car and the frame as the truck goes radial. Since the degree of turning of the car is proportional to the curvature and the positions taken by the frame and wheel sets are proportional to the curvature, the bell crank moves as a function of the relative of turning between the truck and the car. This may assist attaining the radial condition.

In the neutral condition as shown in FIG. 1, the bell cranks will operate so as to restrain oscillation of the control bar and control rods which might otherwise occur as a result of wheel movements caused by defects of the track. The bell cranks impose a holding force on the control bar and this has the effect of dampening or restrain of transient motion of the wheels. Although, I have shown a pair of bell cranks, it is contemplated that a single crank be used.

Figure 8:
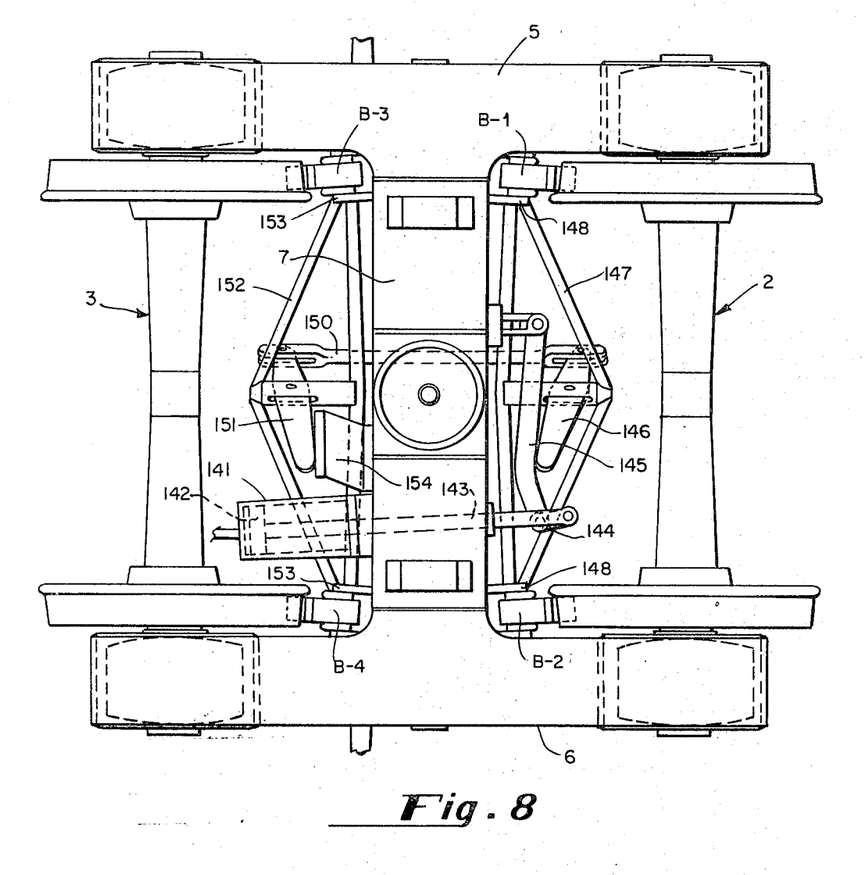
FIG. 8 is a plan view of the truck of FIG. 1 incorporating a typical brake arrangement.

A brake system for activating the brake assemblies B-1, B-2, B-3 and B-4 is illustrated in FIG. 8. The system is of conventional design.

A brake cylinder 141 is mounted on the truck bolster 7 and carries a piston 142 having a rod 143 which is connected by a link 144 to the horizontal brake lever 145 pivotally connected to the bolster 7. The lever 145 bears against the inclined live lever 146 pinned between the arms of the brake beam 147. The beam 147 is suspended from the bolster 7 by brackets 148. The beam carries the assemblies B-1 and B-2. The lower part of the live lever is connected by a rod 150 to the inclined dead lever 151 pinned between the arms of the brake beam 152 suspended from the bolster by the hangers 153. The top of the dead lever bears against the thrust block 154. The beam 152 carries the assembly B-3 and B-4.

For brake application the piston moves to the right and this causes the brake lever 145 to rotate counter clockwise and this pushes the upper part of the live lever 146 also to the right which pivots about its connnection to the rod 150 and this causes the brake beam 147 to apply the assemblies B-1 and B-2. The live lever 146 continues to rotate causing the rod 150 to move to the left which in turns causes the dead lever to pivot about the thrust block 154 and move brake beam 152 to the left which applies the assemblies B-3 and B-4.

Figure 9:
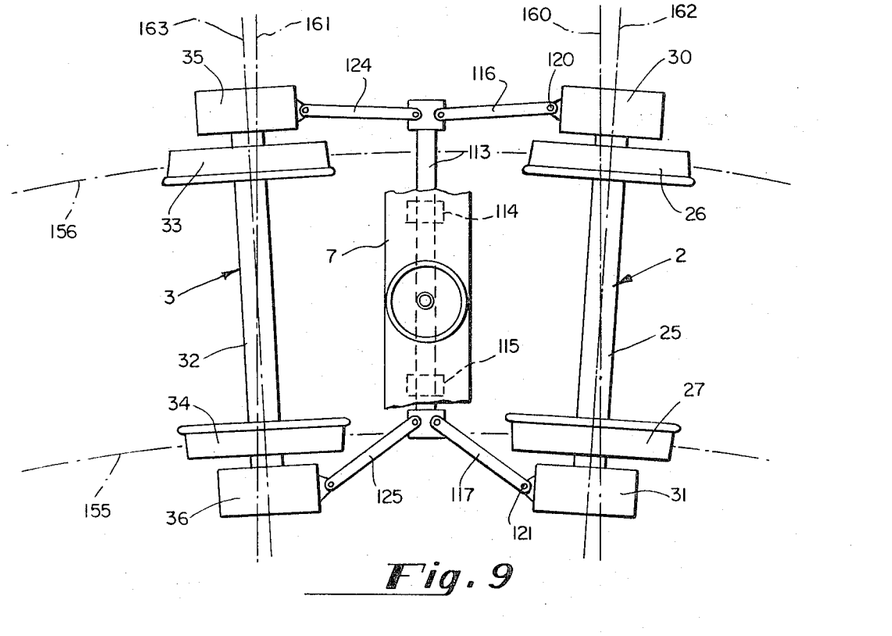
FIG. 9 is a plan view illustrating the radial condition of the truck.

In FIG. 9, I have diagramatically illustrated the radial condition of the truck. The truck can be considered as moving from left to right on the curved tracks 155 and 156 so that wheel set 2 is leading and wheel set 3 is trailing. For descriptive purposes the radial condition and the curvature of the tracks 155 and 156 has been exaggerated. The position of the axes of the axles 25 and 32 in the neutral condition is indicated by the dotted lines 160 and 161 and the position of the axes in the radial condition is indicated by the dotted lines 162 and 163. Theoretically in a true radial condition, the axis 162 and 163 go through the center of curvature for the tracks 155 and 156.

As the truck in the neutral position encounters a curve there are forces set up between the wheels and the tracks due to the curvature. The leading outer wheel 26 tends to move forward and the leading inner wheel 27 tends to move rearward. The wheel set 2 effectively rotates clockwise. The motion of the wheels is in opposite directions and in a horizontal plane containing the axis of the axle 25. The motion is permitted by the pad bearing between the truck frame and the sub-frame 30 and 31.

The forces cause the outer trailing wheel 33 to move rearwardly and the inner trailing wheel 34 to move in the forward direction so that the wheel set 3 effectively rotates counter-clockwise. The motion of the wheels is in opposite directions and takes place in a horizontal plane containing the axis of the axle 32. The motion is permitted by the pad bearings between the truck and the sub-frames 35 and 36.

The slide mounting of the bar 113 and the pivotal mounting of the tie bars permit these components to assume positions as directed by the radial wheel positions. The bar 113 and the tie rods do not cause interference with the wheels attaining the radial condition.

With respect to the fact that the wheel sets rotate in going from neutral condition to the radial condition, I want to point out that this type of motion is accommodated by the design of the sub-frames.

Referring to FIGS. 1 and 7, it will be recalled that the top 55 has arcurately formed sides 84 and 85 and that these bear (FIG. 1) against the side section 42 and 43 of the pocket 13. This same condition prevails in all of the sub-frames. Thus with reference to FIG. 1, it will be apparent that the above described rotation of the leading wheel set 2, the curved side 85 will roll and/or slide on the side section 42 and in the sub-frame 30 the curved side 85a will roll and/or slide against the side section 42a. When the wheel set rotates counter clockwise the same rolling effect takes place.

I claim:
1. In a railway car truck;
a first pair of wheels mounted for rotation about a first axis;
a second pair of wheels mounted for rotation about a second axis;
frame means having mechanism for connecting the frame to a railway car;
first means connected between the frame and the first pair of wheels and providing for the wheels to move in opposite directions relative to the frame in a horizontal plane containing the first axis, said direction being transverse the first axis and said first means preventing the wheels from moving transverse the first axis in the same direction in said horizontal plane, said opposite direction of movement of the wheels being for use in permitting the first pair to attain radial condition when the truck is negotiating a curve on a track and the prevention of wheel motion in the same direction being for use in the maintaining wheel position when the wheel brakes are applied;
second means connected between the frame and the second pair of wheels and providing for the wheels to move in opposite directions relative to the frame in a horizontal plane containing the second axis, said direction being transverse the second axis and said second means preventing the wheels from moving transverse the second axis in the same direction in said horizontal plane, the opposite direction of movement of the wheels being for use in permitting the second pair to attain radial condition when the truck is negotiating a curve on a track and prevention of wheel motion in the same direction being for use in maintaining wheel position when the wheel brakes are applied; and mechanism connected to said first and second means and operative in the nonradial condition of the wheels to dampen or resist said opposite direction of motion for use in attenuating such motion of the wheels due to track imperfections.

2. In a railway car truck;

a truck frame;

a first wheel set including an axle, a pair of wheels on the axle and a pair of sub-frames connecting opposite ends of the axle to the truck frame, each sub-frame having a housing, rotary bearing means in the housing mounting one end of the axle and means including vertical compression springs supporting the housing on the bearing means;

a second wheel set including an axle, a pair of wheels on the axle and a pair of sub-frames connecting opposite ends of the axle to the truck frame, each sub-frame having a housing, rotary bearing means in the housing mounting one end of the axle means including vertical compression springs supporting the housing on the bearing means;

a first pair of pad bearings respectively connected between the truck frame and the housings of said first wheel set and supporting the frame on the housings, the pad bearings providing for the housings of the first set to move with respect to the frame in a horizontal plane and in a direction transverse the axle of the first set;

a second pair of pad bearings respectively connected between the truck frame and the housing of said second wheel set and supporting the frame on the housings, the pad bearings providing for the housings of the second set to move with respect to the frame in a horizontal plane and in a direction transverse the axle of the second set;

first restraining means connected with the frame and with the housings of the first set and permitting the housings of the first set to move in opposite directions and the restraining means preventing the housings from moving in the same direction, the opposite direction of movement of the housings being for use in permitting wheel positioning when the truck is negotiating a curve on a track and the prevention of housing motion in the same direction being for use in maintaining wheel position when the wheel brakes are applied; and second retaining means connected with the frame and with the housings of the second wheel set and permitting the housings of the second wheel set to move in opposite directions and the restraining means preventing the housings from moving in the same direction, the opposite direction of movement of the housings being for use in permitting wheel positioning when the truck is negotiating a curve on a track and the prevention of housing motion in the same direction being for use in maintaining wheel position when the wheel brakes are applied.

3. a construction in accordance with claim 2, wherein each housing has a flat, horizontal surface and wherein each said pad bearing supports the frame on the flat surface.

4. a construction in accordance with claim 3 wherein each said pad bearing comprises rubber adhesively secured to the frame and to the flat surface.

5. a construction in accordance with claim 3 wherein each said pad bearing is formed of teflon secured to the flat surface and a slide plate secured to the frame.

6. a construction in accordance with claim 3 wherein the first restraining means comprises a control bar extending in a direction generally parallel said axles, bushing means in said frame slidingly supporting the control bar, a first tie rod pivotly connected between one end of the control bar and to a housing of the first wheel set, a second tie rod pivotly connected between the opposite end of the control bar and the other housing of the first wheel set and wherein said second restraining means includes said control bar, a third tie rod pivotly connected between one end of the control bar and a housing of the second set and a fourth tie rod pivotly connected between the opposite end of the control bar and the other housing of the second set.

7. A construction in accordance with claim 5 further including a railway car frame, means rotatably supporting the railway car frame on the truck frame, a bell crank pivotally connected to the truck frame, one end of the crank being connected to the control bar and the other end of the crank being connected to the car frame.

8. In a combination:

car truck having four pockets and a sub-frame in each pocket, each sub-frame comprising:

a hollow housing including a pair of end walls and a pair of side walls connected thereto, the side walls having aligned openings to receive an axle bearing;

an axle bearing extending through said openings;

a top on said housing interconnecting the sides and end wall having a flat surface;

a pair of wear plates mounted on the inside of said end walls;

saddle mounted on said bearing, the saddle having a pair of pockets on the opposite sides thereof, each provided with a pair of inclined surfaces;

a pair of friction shoes respectively mounted in said pockets, each shoe having surfaces respectively engaging an inclined surface and a wear plate;

pair of compression springs respectively connected between the friction shoes and the top of the housing;

a plurality of load springs respectively connected between the saddle and top of the housing;

pad bearing means connected between the top of the housing and the truck;

a pair of arcuately formed side edges on said top, the side edges respectively engaging said pocket; and a pair of end edges formed on said top, the end edges respectively being spaced from said pocket.

9. In a railway car truck:

a first pair of wheels mounted for rotation about a first axis;

a second pair of wheels mounted for rotation about a second axis;

frame means having mechanism for connecting the frame to a railway car;

means to attain radial condition of the wheels on a curved track, said means being connected between the frame and the wheels providing in each pair, for the wheels to move transverse the axis of the pair in opposite directions relative to the frame in a horizontal plane, said opposite directions of motion being for use in permitting wheel positioning for the radial condition when the truck is negotiating a curve and said means also preventing the wheels from moving in the same direction transverse the axis, the prevention of wheel motion in the same direction being for use in maintaining wheel position when the wheel brakes are applied; and mechanism connected to said means and operative in the nonradial condition of the wheels to dampen or resist said opposite direction of motion for use in attenuating such motion of the wheels due to track imperfections.

* * * * *